United States Patent [19]

McKnight

[11] 4,156,653
[45] May 29, 1979

[54] THREE PHASE ELECTRICAL POWER OZONE GENERATING SYSTEM

[75] Inventor: William J. McKnight, Huntington, N.Y.

[73] Assignee: TII Corporation, Lindenhurst, N.Y.

[21] Appl. No.: 833,698

[22] Filed: Sep. 15, 1977

[51] Int. Cl.² ............................................. C01B 13/11
[52] U.S. Cl. .................... 250/533; 250/535; 250/536; 250/537; 250/539
[58] Field of Search .............. 250/532, 535, 536, 537, 250/533, 539; 323/43.5 R, 43.5 S, 47

[56] References Cited

U.S. PATENT DOCUMENTS

| 2,660,559 | 11/1953 | Prime | 250/537 |
| 3,226,628 | 12/1965 | Kupferberg | 323/47 |

FOREIGN PATENT DOCUMENTS 269046  4/1927  United Kingdom ...................... 250/532

*Primary Examiner*—Benjamin R. Padgett
*Assistant Examiner*—Deborah L. Kyle
*Attorney, Agent, or Firm*—Morgan, Finnegan, Pine, Foley & Lee

[57] ABSTRACT

A three phase power ozonator system in which the head of an ozonator cell containing multiple cylindrical type elements is tri-partitioned to define three sectors in the cell each of which contains a portion of the total number of cylindrical type dielectric elements. The partitions are made of insulating material such as polyvinyl chloride. Each sector is distinct and each sector is adapted to be operated with single phase electrical power. As a result the ozonator cell as a whole is able to operate using three phase electrical power. This arrangement allows for the operation of the ozonator cell in a system having any number of other three phase electrically operated components of equal or smaller electrical load than the ozonator cell in such a way that a balanced electrical load is maintained throughout the system.

An electrical supply and control sub-system including a three phase power transformer, current sensors for each electrical sector and voltage sensor for one sector, current and voltage comparators and a variable transformer driven by a reversible electric motor, provides current to the electrodes in all sectors, monitors the current in all phases and turns off the electrical supply if significant imbalances among the sectors are detected.

9 Claims, 5 Drawing Figures

THREE PHASE ELECTRICAL POWER OZONE GENERATING SYSTEM

BACKGROUND OF THE INVENTION

This invention relates to improvements in systems for generating and dispensing ozone. In particular it relates to improvements in the electrical and physical designs of those ozone generating systems which generate ozone from air or oxygen using high voltage electric fields.

For nearly twenty years corona discharge ozonators have been available from manufacturers including the Kerag Company of Switzerland, Welsbach, Union Carbide, Sauter, Degrement, Trailigaz and others. The Kerag system is typical of many of these and is one of the best known corona discharge ozonating systems.

In the Kerag systems air is sucked in, and it is then drawn (again by suction) through silica gel in order to dry it, and then through various types of filters (in which airborne particles are removed) in order to purify it. The oxygen in the air is converted into ozone by a corona discharge; finally, the generated ozone is sucked into an electrically operated mechanical dispenser which ejects it into the surrounding atmosphere (normally contaminated air or liquid). The structure and operation of the Kerag system is described in Kerag Brochure of 1976 entitled "Ozonized Water=Hygienic Water" which is herein incorporated by reference.

In the Kerag systems, the ozone generation occurs in what is known as an ozone generating cell. The cell is a large drum with a metallic disc at the top. Glass cylindrically shaped tubes, which, are, however, closed at the lower end, are held in the drum and extend from the bottom of the drum nearly to the top; a hollow metallic electrical conductor inside each glass tube makes contact through a high voltage fuse with the disc at the top of the drum and extends from the top of the glass tube downward to almost the bottom of the tube. The drum contains water which surrounds the glass tubes along most of their vertical lengths. The upper portions of the inner metallic tubes are open to allow the inward passage of air. Outward passage of ozone also occurs through the open tops of the glass tubes. Electrical current is fed through the metal disc at the top of the drum through the fuses and then to the metallic inner electrodes thereby producing a corona discharge between the outer surface of the inner metallic tube and the inner surface of the glass tube. When air or oxygen is sucked into the glass tubes ozone is thus produced and then is sucked out of the tubes and to the point of dispersion. Thus, it is clear that the principal phenomenon effected in the Kerag ozonator system is electrical—it is the production of ozone from air or oxygen by corona discharge in the glass tubes of the ozonator cell.

However, some of the other major components of the Kerag system are electrical as well. The Kerag disperser includes a mechanical mixer with a rotatable shaft which is driven by an electric motor. In addition there is an electrically driven heater and blower subsystem in the system. Before any ozone production takes place, air is drawn into the system and is passed through a tank of dried silica gel material; the silica gel removes moisture from the air. This provides for more efficient conversion of oxygen to ozone and prevents the undesirable formation of nitric acid. However, eventually, the silica gel becomes saturated with moisture and is no longer effective in absorbing water from the air. The silica gel tanks are therefore equipped with heaters and blowers which provide heat to the silica gel which dry it and make it suitable for continued use as a moisture absorbant. The regeneration heater and blower in the Kerag systems is electrically operated.

Thus, it is apparent that several components of an ozone generating system are usually electrical and that the electrical loads imposed in such a system by these components vary significantly. The ozonator cell in which the corona discharge occurs constitutes a heavy electrical load. The disperser which operates whenever the ozonator cell is operated constitutes a much lighter electrical load. The heater and blower systems also constitute relatively light electrical loads.

Normally, all of the electrical components of the Kerag type system are driven by three phase a-c power provided by a local power company. In other cases, an auxiliary three phase power unit is utilized. Those skilled in the art are well aware that it is good engineering practice to provide a balanced electrical load throughout an electrical system, thereby assuring uniform power and voltage levels for each power phase in the system. It has been recognized that this can be done in an ozonator system such as the Kerag system, theoretically, by connecting a three phase transformer to the three phase electrical supply so as to provide three phase power to the ozonator cell, the heaviest electrical load component in the system. However, formidable practical obstacles have, prior to this invention, prevented the development of such a balanced load ozonator system.

Accordingly, in the Kerag systems a single phase transformer is connected across one phase of the three phase electrical supply and supplies single phase power to the ozonator cell. Thus, for most of the time that such a system is operated, the electrical load is unbalanced because the single phase transformer connected to the ozonator cell constitutes a very heavy electrical load on one phase as compared to the relatively light electrical loads on the other two phases of the electrical supply.

One factor preventing the development of an ozone generating system operating with a balanced electrical load, was the art's manifested belief that a balanced load system was more costly than the unbalanced system. It was believed that the balanced load system, in which the ozonator cell is driven by three phase power, would require separate electrical control equipment for each power phase. Thus, it was thought, that to control the voltage in a single ozonator cell, three control systems would be required. Naturally, this would have involved considerable additional expense.

A second factor preventing the development of a balanced three phase power system was the perceived danger. It was believed that it was not possible to provide adequate insulation in an ozonator cell operated on three phase electrical power which would prevent leakage and arcing.

Efforts have been made in the art to develop an ozonator cell capable of being operated with three phase power. However, prior to the present invention all efforts were unsuccessful.

It is an object of the present invention to provide a balanced electrical load ozone generating system.

It is a particular object of this invention to provide an improvement over systems of the Kerag type by providing a partitioned ozonator cell which can be driven by three phase power. It is a further object of the present invention to overcome the problems which have heretofore prevented the development of a balanced electrical load ozonator system and to provide a safe and efficient, properly insulated, partitioned ozonator cell capable of being driven by three phase power at a reasonable cost.

It is a further object of this invention to provide a novel electrical control system for controlling the electrical operation of a three phase power ozone generating system.

SUMMARY OF THE INVENTION

Briefly, the present invention, in its preferred embodiment, comprises a partitioned drum shaped ozonator cell, adapted to be driven by three phase power. Each section of the ozonator cell contains a portion of the total number of ozone generating tubes, each of which contain an electrode. Each section of the ozonator cell is driven by a single phase of the system's three phase power. The upper interior portion of the cell (the head) is physically partitioned by three sheets of insulating material radiating from the central axis of the cell and disposed so that each partition sheet forms an angle with the other of approximately 120° at the axis of the cell. The upper cylindrical wall of the cell is composed of transparent insulating material to allow physical observation of the cell partitions and the tops of the ozone generating tubes. The electrical supply and control system includes current or voltage sensors for each power phase, voltage or current comparators for comparing voltage or current levels in each phase, a three phase power transformer which provides electrical power to the electrodes in each sector and means for adjusting the current level on the primary windings of the three phase power transformer in response to signals received from the current and voltage sensors and comparators. The specific scope of the invention together with the special advantages provided thereby will become apparent from the claims and the detailed description of the preferred embodiment which are presented below.

DETAILED DESCRIPTION OF PREFERRED EMBODIMENTS

The Ozonator System

In order to afford a complete understanding of the invention and an appreciation of its advantages, a description of a preferred embodiment in a typical environment is presented below.

Figure 1:
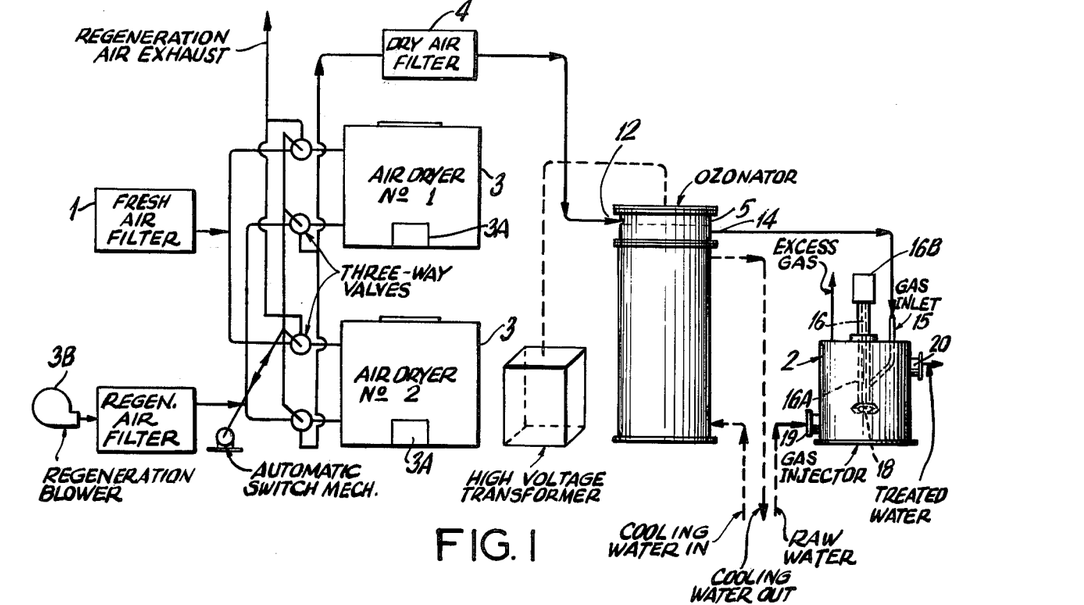
FIG. 1 is a schematic illustration of the major components of an ozone generating system.

To better understand and appreciate the present invention and its advantages, it is helpful to understand in general, the structure and operation of an ozone generating system of the Kerag type illustrated in FIG. 1.

Referring now to FIG. 1, air from the surrounding atmosphere is sucked into the system through a 5 to 50 micron fresh air filter 1. This fresh air filter removes airborne particles from the air. The suctional force is provided by the ozone disperser 2 which discharges ozone out of the system as will be explained more fully below.

The air is then drawn to an air dryer 3 where it passes downward through a bed of silica gel. The silica gel absorbs moisture from the air, thereby drying the air. This drying of the air allows for a more efficient conversion of the oxygen of the air into ozone and prevents the formation of nitric acid during the corona discharge (if the air is not dry, the ionization that is effected by corona discharge may cause the combining of water with nitrogen compounds formed during ionization of air to form nitric acid). When the silica gel becomes saturated with water, it may be dried and thus reactivated as a moisture absorbant by heating supplied by electrical heater and blower 3A and 3B, respectively. An alternative air dryer may be provided for operation during periods when the primary air dryer is being reactivated. When the air has been dried it is drawn through a second filter 4 which provides further removal of air-borne particles. Filters in the range of 0.5 to 5 microns may be employed as a dry air filter.

Next the dried and purified air passes, again by suction, to the ozonator cell 5.

Figure 2:
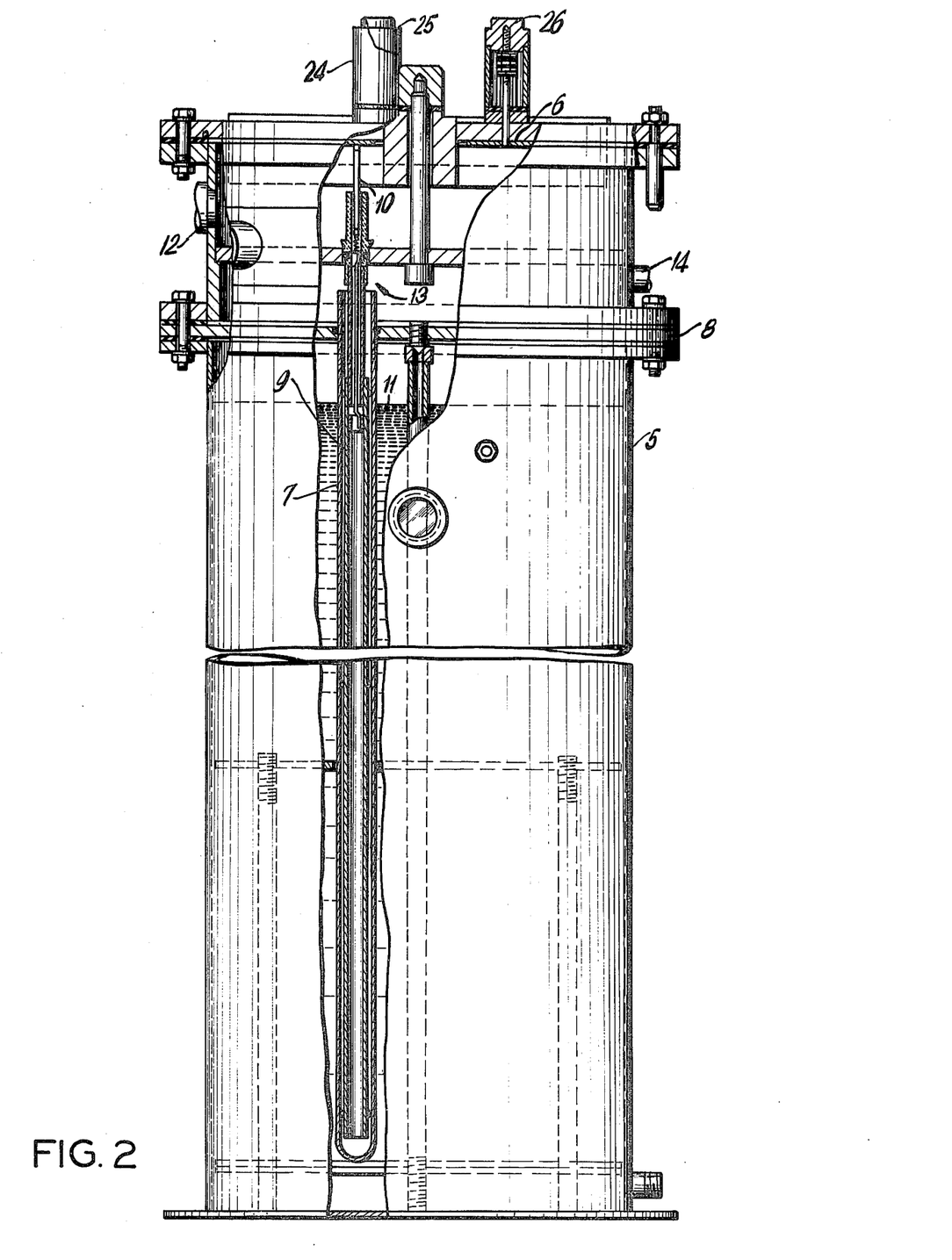
FIG. 2 is a side view of the partitioned ozonator cell, partially cut away, to show one of the ozonator tubes, in accordance with the present invention.

Referring now to FIG. 2, the ozonator cell 5 is a drum, approximately five feet in height, having a metallic disc 6 forming its inner top. Glass tubes 7, which are open at the top, closed at the bottom and cylindrical along their length are vertically arranged in the cell and protrude slightly above metallic disc 8 through openings provided in metallic disc 8. A hollow metallic electrical conducting shaft 9 makes electrical contact through high voltage fuse 10 with metallic disc 6 at the top of the drum. The drum 5 is filled with water, illustrated as item 11, which surrounds the glass tubes.

Air is drawn by suction from the dry air filter 4 into the cell through inlet 12, shown in FIG. 1 and in more detail in FIG. 2. The air is then drawn into the hollow metallic electrical shafts 9 in the open tubes 7.

Electrical current is fed through metal disc 6 at the top of the cell, through the fuses 10 to the metallic electrodes 9.

The air is sucked to the bottom of the interior of the hollow metallic electrical shafts 9 and then up the tubes 7 between the outer surfaces of the electrodes 9 and the inner surfaces of the glass tubes 7. Simultaneously, current is fed into the electrodes and a corona discharge is produced between the electrodes and the surrounding glass. This causes the ionization of oxygen in the air and the production of ozone. As the ozone is produced, it is sucked up and out of the tubes 7, at points 13 of the tubes, and out of the cell 5 through outlet 14, as shown in FIG. 2.

Referring again to FIG. 1, the ozone that has been produced in the tubes 7 and outlet from the cell 5 is drawn into the ozone disperser 2 through the inlet 15. The ozone is then dispersed into container 17 by the rotation of the turbine 18 at the bottom of the shaft 16. The shaft 16, surrounded by shroud 16A, is rotated at high speed, on the order of 1750–3600 rpm by an electrical motor 16B. The high speed rotation of the turbine 18 and the rapid expelling of gas from the system created thereby creates a vacuum in the system which provides for the intake of air into the system at fresh air filter 1 and the drawing of air and, after its conversion, ozone, through the system. The dispersed ozone purifies the contaminated fluid that has entered the disperser 2 through inlet 19. Thus, as the fluid of disperser 2 exits through outlet 20, it is in a purified condition.

It should be apparent already that two major portions of the system which operate simultaneously—the ozonator cell and the disperser are powered by electricity. It should be apparent also that the production of ozone in the cell 5 occurs by virtue of a high voltage, high power phenomenon, and that the electric power required to drive the disperser shaft 16 is less than that required for ozonation. The air dryer heater and blower are also electrically powered and constitute relatively light average electrical loads.

Three Phase Partitioned Ozonator Cell

An important aspect of the invention is a partitioned ozonator cell which is driven by three phase electrical power.

Figure 3:
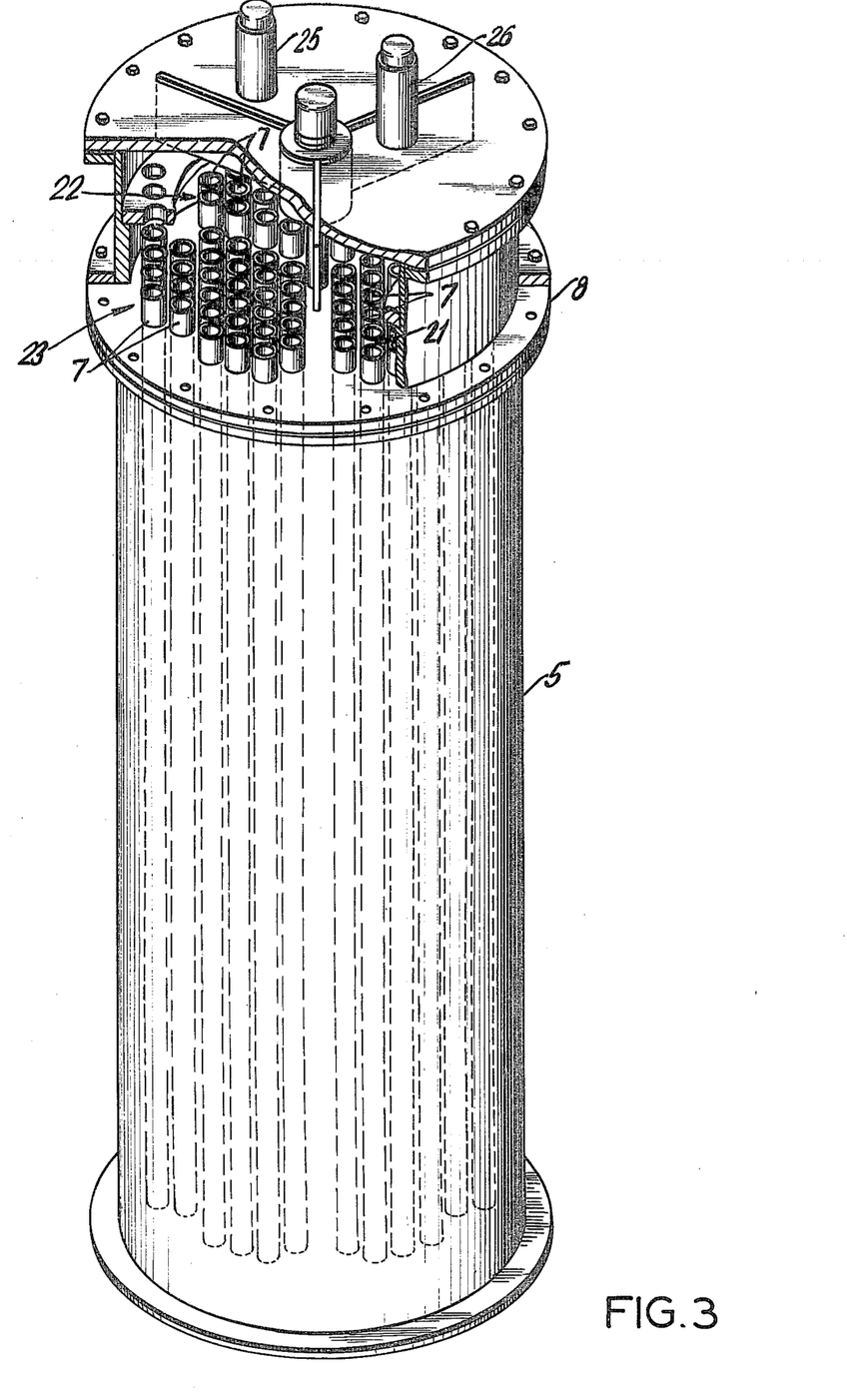
FIG. 3 is a top perspective view of the partitioned ozonator cell and the ozonator tubes in accordance with the present invention.

Referring now to FIG. 3, the ozonator cell 5 is organized in three sectors, 21, 22 and 23 respectively. Three sheets of insulating material such as polyvinyl chloride (PVC) radiate from the central axis of the head of the cell and are disposed so that each partition sheet forms an angle of about 120 degrees with the other at the axis of the cell (alternatively, there may be additional partitions and/or different angular disposition of the sheets with respect to one another). Preferably the PVC partition sheets should be about ½ to 1 inch in thickness. Each sector of the cell contains a portion of the glass ozone generating tubes 7. The upper outer wall of the cell 5, i.e. the outer portion between metallic disc 8 and top metallic disc 6, is in a preferred embodiment composed of transparent insulating material (e.g. transparent PVC) which allows for human observation into the cell and of the ozone generating tubes. Alternatively, this portion of the cell may be composed of opaque PVC and may have observation ports located therein. Observation ports may also be located below metallic disc 8 as shown in FIG. 2.

Each sector in the cell is driven by one phase of the three phase electrical power provided to cell. Three phase electrical power is provided to the cell 5 at terminals 24, 25 and 26 (shown in FIG. 2). As those skilled in the art are aware, this means three phases of alternating current are transmitted to the cell, each current phase being approximately 120 degrees out of phase with the other. (As those skilled in the art known, three phase power is normally generated by high speed rotation of a magnetic field within an equilateral triangle formed by electrical coils and terminals—a delta arrangement; the coils form the sides of the triangle and the terminals its points. The rotating magnetic field thus induces current in each of the three coils, but because of their geometric angular displacement from one another, the current induced in each coil is 120 degrees out of phase with that in each of the other coils).

Terminal 26 receives one phase and provides for its transmission through metallic disc 6 to the electrodes in the ozonator tubes in sector 21. Similarly, terminals 25 and 24 respectively, provide the necessary connection so that a phase of the three phase alternating current flows to the electrodes in sectors 22 and 23.

Thus, it should be clear that the heavy electrical power load of the ozonator cell (which for a 91 ozonator tube cell, which produces 220 grams of ozone per hour, will amount to about 4.5 kilowatts/hr.), will not be imposed on a single phase of the three phase power supply, but will be distributed over the three phases. The advantage of this is a balanced electrical load which assures voltage and current uniformity among phases.

As is known by those skilled in the art, voltage differences between phases in such an ozone generating system as has been described can result in the overheating of the electrical motors that drive the silica gel regeneration blower and the ozone disperser. Voltage differences can also result in non-uniform production of ozone.

For example in a Kerag type system which is not equipped with the present invention and in which one phase of the three phase electrical supply drives the ozonator cell, for approximately 83% of the time the system is operated (i.e. during ozone generation), the three phase load is unbalanced because the transformer which feeds power to the cell constitutes a very heavy electrical load on one phase as compared to the electrical load on the other two phases of the three phase electrical power supply. For the remaining 17% of the time (during regeneration of the silica gel—i.e. when the heater and blower are on), higher power is demanded from the primary power supply. Thus, an unbalanced condition still exists but not to such a high degree as when the regeneration heaters and blowers are not operating.

The Electrical System

Figure 4:
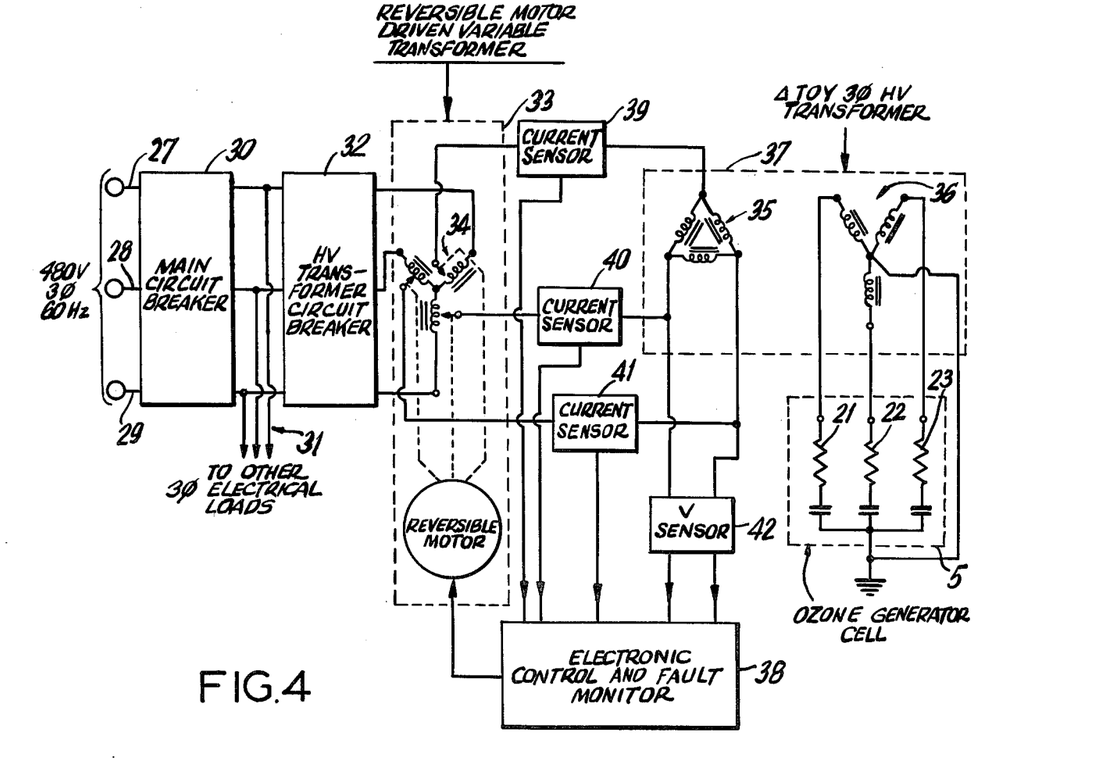
FIG. 4 is an electrical circuit schematic illustrating the general electrical structure and operation of the three phase power ozone generating system of the present invention.

The electronics of the ozonator system are schematically illustrated in FIG. 4.

Three phase electrical power (e.g. 480 volts, three phase, 60 Hz, alternating current) is provided to the system via lines 27, 28 and 29 and through main circuit breaker 30. The three phase alternating current is then provided directly to all electrical components of the system other than the ozonator cell, i.e. the electric motor that drives the disperser and the silica gel regeneration heaters and blowers, via lines 31. Three phase electrical power is provided to the ozone generator cell 5 through a three phase high voltage transformer circuit breaker 32 and three phase high voltage variable transformer 33.

In the three phase high voltage variable transformer 33, the three windings are in a standard three phase Y configuration 34. Connected to the windings 34 of variable transformer 33 are the three primary windings 35 of high voltage transformer 37 which are arranged in a standard delta configuration. The alternating current induced in the coils of delta configuration 35 induces the transformed current in the secondary coils 36 of transformer 37. Each of the secondary windings of transformer 37 provide transformed alternating current to one of the sectors (21, 22 and 23 in both FIGS. 3 and 4) of the ozonator cell 5. As has been mentioned, the ozonator cell primary power, for a cell capable of producing in the range of 50 to 1000 grams of ozone per hour, is preferably 480 volts, 60 Hz, 3 phase. The power provided to each sector is 9000–12000 V, 60 Hz, single phase.

Typical suitable electronic equipment which would be used in the illustrated circuit is listed in the table below.

Main Circuit Breaker—Square D Model FAL34035
HV Transformer Circuit Breaker—Square D Model FAL26015
Variable Transformer—STACO, P/N 30M-122 CT-3
Delta to Y Transformer—Tech-Tran Delta to Y, Tech-Tran Corp., Rancocas, N.J.

As is also illustrated in FIG. 4, in the preferred embodiment, all three power phases are controlled simultaneously. The three phase, motor driven, variable transformer (commonly called a three deck unit) 33 operates to change voltage and current equally on all three of the primary windings of transformer 37 (a saturable reactor could alternatively provide this function). An electronic control and fault monitor 38 receives signals from current sensor 41 and voltage sensor 42 on one power phase. The control 38 controls the variable transformer drive motor in response to these signals which in turn controls voltage and current on all three phases. Thus, the phase in which current is sensed by current sensor 41 serves as a standard for the other 2 phases. In addition, since failure of all or part of the glass tubes or electrodes in any of the sectors of the ozonator cell can occur, additional current sensors 39 and 40 continually sense current flowing in the remaining two windings of the three primary windings of transformer 37 and compare these currents to the standard current reading from sensor 41. Thus, deviations in the current of any phase as compared to the others can be detected.

Thus, each of the three power phases and each sector is controlled simultaneously and additionally currents in all three phase are continually being compared. If the phase currents become unbalanced significantly, e.g. beyond 5% or 10% of equal value, the ozonator cell can be shut down. Suitable sensing equipment is listed in the table below.

Sensors 39-41—Current Transformer CT, Midwest Electric Products, Monkato, Minn.
Sensor 42—Voltage Transformer, Electro Mel Industries, Hazelhurst, Wis.

Voltage or wattage sensors may also be used to monitor each phase. These may be provided either in addition to or as an alternative for current monitors.

Figure 5:
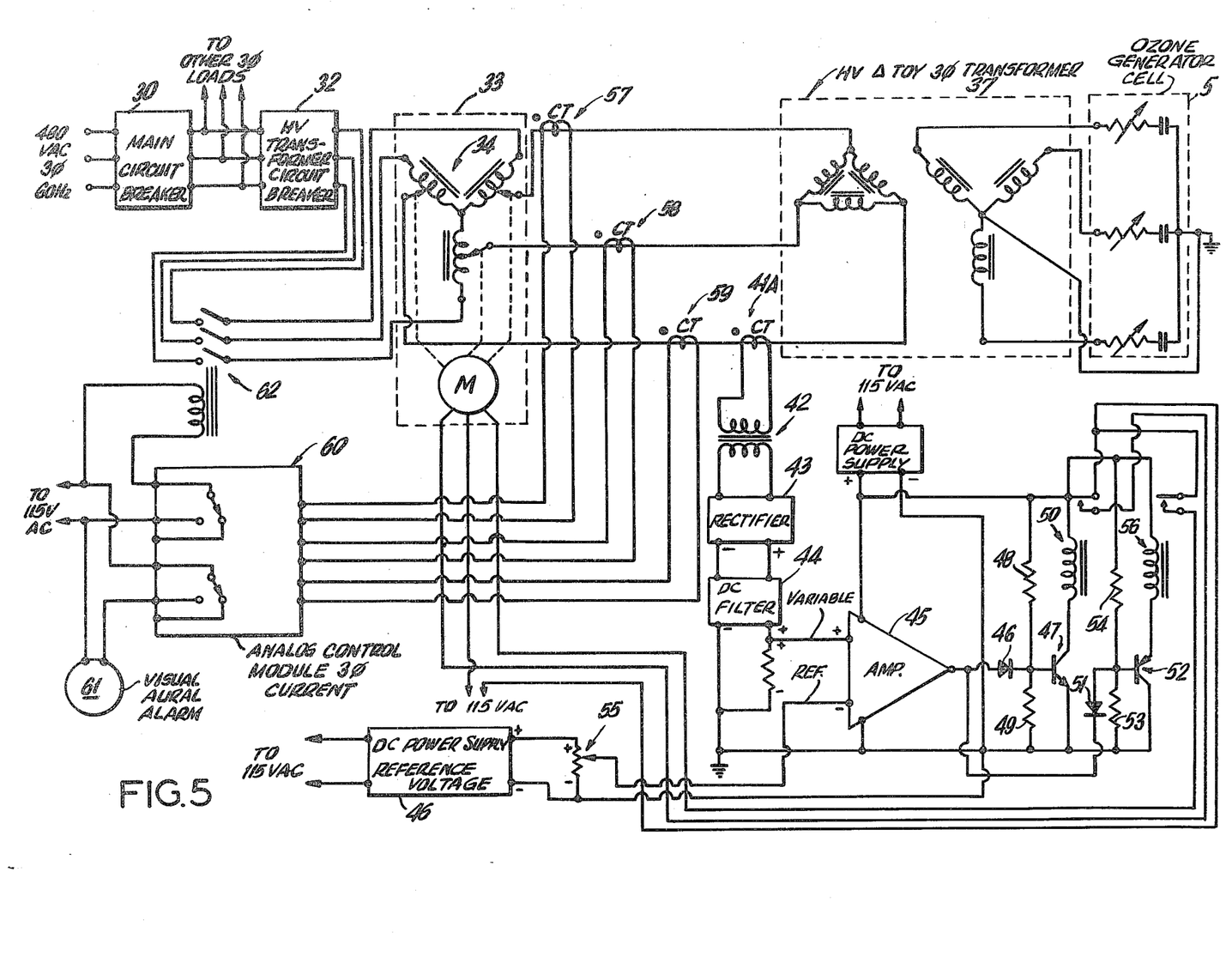
FIG. 5 is an electrical circuit schematic illustrating in detail the electrical structure and operation of the three phase power ozone generating system of the present invention.

FIG. 5 illustrates in greater detail the manner in which all three phases of the HV transformer primary are controlled simultaneously. The motor driven three phase variable transformer 33 (commonly called a three deck unit) operates to change voltage and current equally on all three of the primary windings of transformer 37. Current on one phase (which is the "standard phase") is sensed by a current transformer (CT) 41A. This current is converted to an AC voltage by transformer 42, is then rectified and converted to DC by rectifier 43, is filtered by DC filter 44 to remove AC components, and is applied to the (+) input of an operational amplifier 45.

A variable DC reference voltage is obtained from power supply 46 and is fed to the (−) input of the operational amplifier 45. In the operational amplifier 45, a positive DC signal at the (−) input makes the output voltage move in a negative direction. A DC signal at the (+) input makes the output voltage move in a positive direction. Thus, when the DC voltage level at both the (+) and (−) inputs to the operational amplifier are equal, the operational amplifier output is at zero volts.

Thus, if +5 is inputted to the (−) input terminal of operational amplifier 45, and +7 volts is inputted to the (+) input terminal, the output will provide an amplified positive voltage. Conversely, if +5 volts is at the (−) input terminal and only +3 volts is at the (+) input terminal, the output will provide an amplified negative voltage.

When the output of operational amplifier 45 is positive, this voltage is fed through isolating diode 46 to the base of NPN transistor 47 which is normally biased for zero collector current by resistors 48 and 49. The positive voltage fed to the base of transistor 47 then makes it conduct, activating relay 50 and closing its contacts. This then connects 115 VAC power to the drive motor of variable transformer 33 causing it to rotate and lower voltage and current to all three phases of the HV transformer 37 primary. Simultaneously, the variable DC input to the (+) input of operational amplifier 45 decreases. When the DC voltage equals the value of DC reference voltage fed to the (−) input of operational amplifier 45, the drive motor of variable transformer 34 stops since the output voltage of operational amplifier 45 goes to zero volts, NPN transistor ceases to conduct, and the contacts of relay 50 open removing power from the drive motor.

Similarly, when the output voltage of operational amplifier 45 goes negative because the positive variable voltage to the (+) input is less than the positive input voltage to the (−) input, the negative voltage output of the operational amplifier 45 is fed through isolating diode 51 to the base of PNP transistor 52 which is normally biased for zero collector current by biasing resistors 53 and 54. This negative base voltage causes transistor collector current to flow closing the contacts on relay 56. Contact closing of relay 56 applies AC power to the drive motor of variable transformer 33 which turns the arms of each deck of the variable transformer 33 to equally increase voltage and current to each primary winding of the three phase HV transformer 37. Thus, current is increased through current transformer 41A and DC voltage is increased to the (+) input of operational amplifier 45. When this voltage reaches the same value as the DC voltage applied to the (−) input of the operational amplifier 45, the output of operational amplifier 45 goes to zero volts, the collector current of PNP transistor 52 goes to zero, contacts on relay 56 open removing electrical power from the drive motor of variable transformer 33.

By rotating potentiometer 55, varying values of +DC are applied to the (−) input of operational amplifier 45. Thus, this potentiometer can be used to provide very fine adjustment of ozone output since the system operation described above is related to this value of reference voltage. If the reference voltage is high, higher voltage and current is applied equally to all primary windings of the HV transformer 37. Consequently, the ozone output of the ozone generating cell is high. If the potentiometer 55 is rotated to place zero volts at the—input to operational amplifier 45, then the voltage and current to the primary windings of HV transformer 37 is made to go to zero and the ozone output will be zero.

In a typical ozonator it is possible that glass tube dielectrics will break. If this should occur, the individual HV fuse associated with each glass tube dielectric electrically disconnects the inner HV electrode. Since glass tube dielectric breakage is random, it is conceivable that more will break in one section of the ozone generator cell than in the remaining two sections. Thus, the load on each phase of the secondary of the HV transformer can become unbalanced. This secondary load unbalance is reflected in the primary windings as current unbalance between the phases. Since the current of only one phase is being used to control the other two phase currents in the primary windings of HV transformer 37, a means of detecting current unbalance between the three phases is required. This is performed by means of current transformers (CT) 57, 58 and 59 in FIG. 5 (57 and 58 in FIG. 5 correspond to 39 and 40 in FIG. 4; 41 in FIG. 4 represents both 41A and 59 in FIG. 5) and the analog control module 60.

If current unbalance exists beyond tolerances which are established by an adjustable control on the analog control module 60, relay contacts open activating an alarm 61 and removing electrical power from the magnetic coil of magnetic contactor 62. Thus, the electrical power to the variable transformer 33 and the HV transformer 37 is disconnected stopping generation of ozone. The alarm 61 alerts operating personnel that a fault exists in the system.

Thus, it should be clear that the present invention solves the difficult problems of controlling a three phase power ozonator cell at relatively low cost without the necessity of using three separate control systems. The cost of the additional current sensors and the three phase current comparator is about one-tenth the cost of the electronics control package necessary for a single phase operation. Additionally, by distributing the capacitance load of the ozonator cell equally over the three phases, the net capacitance per phase will be reduced—as a result, the power factor on each phase will tend to move toward unity (an expensive tunable transformer is used in a single power phase ozone generating system of the Kerag type in order to assure as close to unity power factor as possible on the ozonator cell phase; this device is unnecessary in the system of the present invention).

It should be clear that the above description of preferred embodiments in no way limits the scope of the invention which is defined in the claims.

What is claimed is:

1. A three phase electrical power ozonator cell for producing ozone to purify liquid or gas organized into three electrical sectors, each sector containing at least one ozonator tube for generating ozone from air, and said at least one ozonator tube in each sector being driven by a unique single phase of a three phase electrical power supply.

2. A three phase electrical power ozone generating system for producing ozone to purify liquid or gas comprising:
   a. means for intaking oxygen;
   b. means adapted to accept the intaken oxygen from said oxygen intaking means for drying the intaken oxygen;
   c. filtering means adapted to accept the dried, intaken oxygen from said filtering means for purifyng the dried, intake oxygen;
   d. ionization means adapted to receive intaken dried and purified oxygen from said filtering means for converting the dried, purified, intaken oxygen into ozone, said ionization means being arranged into three ionization sectors, each sector comprising at least one ozonator tube, each at least one tube in each said sector containing an electrode powered by a single phase of three phase electrical power supply;
   e. a three phase electrical power transformer connected to each of said ionization sectors for providing a separate phase of a three phase electrical power supply to each of said sectors;
   f. means for monitoring and controlling the electric power supplied to each sector; and
   g. means for receiving ozone from said ionization means and for dispersing the received ozone.

3. A three phase electrical power ozone generating system as claimed in claim 2, wherein the ionization means comprises a cylindrical cell the head of which is tri-partitioned by three sheets of insulating material, each of which is approximately ½ to 1 inches in thickness, which radiate from the axis of the cell so as to form three angles, each of approximately 120 degrees, at the axis of the cell.

4. A three phase electrical power ozone generating system as claimed in claim 3, wherein the tri-partitioned cylindrical cell is composed of transparent insulating material at its upper end.

5. A three phase electrical power ozone generating system as claimed in claim 2, wherein the means for monitoring and controlling the electric power supplied to each sector comprises:
   a. unique conducting means for providing electrical connection between each secondary winding of the three phase power transformer and each of the sectors;
   b. means connected to each of said conducting means for sensing the current in each of said conducting means,
   c. means connected to the conducting means to one standard sector for sensing the voltage in said conducting means;
   d. means for comparing the sensed voltage in said one standard sector conducting means to a designated range of acceptable voltages for said standard sector and for transmitting error signals if the sensed voltage is not in the acceptable range;
   e. means for comparing the current sensed on the conducting means to said standard sector to the current sensed on the conducting means to the other two sectors and for transmitting error signals if the compared currents are not within acceptable tolerances; and
   f. means for varying the current and voltage on the primary windings of said three phase power transformer in response to said transmitted error signals.

6. A three phase electrical power ozone generating system as claimed in claim 5, wherein said means for varying the current and voltage level of the primary windings of the three phase power transformer in response to the transmitted error signals comprises a variable transformer driven by an electric motor.

7. A three phase electrical power ozone generating system as claimed in claim 5, wherein said means for varying the current and voltage level of the primary windings of the three phase power transformer in response to the transmitted error signals comprises a saturable reactor.

8. A three phase electrical power ozone generating system as claimed in claim 2, wherein the means for monitoring and controlling the electric power supplied to each sector comprises:
   a. unique conducting means for providing electrical connection between each secondary winding of the three phase power transformer and each of the sectors;

b. means connected to each of said conducting means for sensing the voltage in each of said conducting means;
c. means for comparing the sensed voltage in one standard sector conducting means to designated range of acceptable standard voltages for said sector and for transmitting error signals if the sensed voltage is not in the acceptable range;
d. means for comparing the voltages sensed on said standard conducting means to the voltages sensed on the conducting means to the other two sectors and for transmitting error signals if the compared voltages are not within acceptable tolerances of one another; and
e. means for varying the current and voltage on the primary windings of said three phase power transformer in response to said transmitted error signals.

9. A three phase electrical power ozone generating system as claimed in claim 4, wherein the means for monitoring and controlling the electric power supplied to each sector comprises:

a. unique conducting means for providing electrical connection between each secondary winding of the three phase power transformer and each of the sectors;
b. means connected to each of said conducting means for sensing the wattage in each of said conducting means;
c. means for comparing the sensed wattage in one standard sector conducting means to designated range of acceptable standard wattages for said sector and for transmitting error signals if the sensed wattage is not in the acceptable range;
d. means for comparing the wattages sensed on said conducting means to said standard sector to the wattages sensed on the conducting means to the other two sectors and for transmitting error signals if the compared wattages are not within acceptable tolerances of one another; and
e. means for varying the current and voltage on the primary windings of said three phase power transformer in response to said transmitted error signals.

* * * * *